United States Patent [19]

Shinmura et al.

[11] Patent Number: 5,532,317
[45] Date of Patent: Jul. 2, 1996

[54] PROCESS FOR PRODUCING A MALEIMIDE-MODIFIED HEAT-RESISTANT ABS RESIN

[75] Inventors: Tetsuya Shinmura; Kunihiko Konishi, both of Ichihara, Japan

[73] Assignee: Denki Kagaku Kogyo Kabushiki Kaisha, Tokyo, Japan

[21] Appl. No.: 433,020

[22] Filed: May 3, 1995

[30] Foreign Application Priority Data

May 27, 1994 [JP] Japan .................................. 6-115206

[51] Int. Cl.⁶ ...................................... C08L 51/04
[52] U.S. Cl. .................................. 525/73; 525/71
[58] Field of Search ................... 525/73, 71, 197

[56] References Cited

U.S. PATENT DOCUMENTS

| | | |
|---|---|---|
| 4,404,322 | 9/1983 | Saito et al. . |
| 4,668,738 | 5/1987 | Lee ............................................ 525/83 |
| 4,829,125 | 5/1989 | Yeo ........................................... 525/194 |
| 4,994,515 | 2/1991 | Washiyama .............................. 524/269 |
| 5,100,947 | 3/1992 | Puydak .................................... 524/423 |

FOREIGN PATENT DOCUMENTS

| | | |
|---|---|---|
| 0134519 | 3/1985 | European Pat. Off. . |
| 0202615 | 11/1986 | European Pat. Off. . |
| 0587907 | 3/1994 | European Pat. Off. . |
| 2329705 | 5/1977 | France . |
| 2-20528 | 1/1990 | Japan . |

*Primary Examiner*—Vasu S. Jagannathan
*Attorney, Agent, or Firm*—Oblon, Spivak, McClelland, Maier & Neustadt

[57] ABSTRACT

A process for producing a maleimide-modified heat-resistant ABS resin comprising a maleimide copolymer, an ABS graft copolymer and an AS copolymer, which comprises kneading a maleimide copolymer, an ABS graft copolymer and optionally an AS copolymer to obtain a heat-resistant master batch resin, and further kneading an ABS graft copolymer and an AS copolymer to the heat-resistant master batch resin or kneading a resin composed of an ABS graft copolymer and an AS copolymer, to the heat-resistant master batch resin.

14 Claims, No Drawings

PROCESS FOR PRODUCING A MALEIMIDE-MODIFIED HEAT-RESISTANT ABS RESIN

The present invention relates to a process for producing a maleimide-modified heat-resistant ABS resin. By employing the process of the present invention, it is possible to obtain a maleimide-modified heat-resistant ABS resin excellent in falling weight impact strength, and it is possible to reduce the wall thickness of a molded product as compared with a maleimide modified heat-resistant ABS resin obtained by a conventional process. Accordingly, the maleimide-modified heat-resistant resistant ABS resin prepared by the process of the present invention can be applied to various fields including fields of automobile parts, electric or electronic parts, household electric parts and sundries.

Heretofore, it has been common for the preparation of a maleimide-modified heat-resistant ABS resin to knead a maleimide copolymer, an ABS graft copolymer and an AS copolymer all at once to obtain a maleimide-modified heat-resistant ABS resin. However, such a conventional process has a drawback that no adequate falling weight impact strength can thereby be obtained, and particularly when a pigment is added, the falling weight impact strength deteriorates substantially.

It is an object of the present invention to provide a process for producing a maleimide-modified heat-resistant ABS resin which has high falling weight impact strength and which undergoes no substantial deterioration in the falling weight impact strength even when a pigment is incorporated.

The present invention provides a process for producing a maleimide-modified heat-resistant ABS resin comprising a maleimide copolymer, an ABS graft copolymer and an AS copolymer, which comprises kneading a maleimide copolymer, an ABS graft copolymer and optionally an AS copolymer to obtain a heat-resistant master batch resin, and further kneading an ABS graft copolymer and an AS copolymer to the heat-resistant master batch resin or kneading a resin composed of an ABS graft copolymer and an AS copolymer, to the heat-resistant master batch resin, whereby it is possible to obtain a maleimide-modified heat-resistant ABS resin which has high falling weight impact strength and which is less susceptible to deterioration in falling weight impact strength even when a pigment is incorporated.

Now, the present invention will be described in detail with reference to the preferred embodiments.

Firstly, the maleimide copolymer which may be used in the present invention, will be described.

As a first method, the maleimide Copolymer can be obtained by a method of copolymerizing a mixture comprising an aromatic vinyl monomer, an unsaturated dicarboxylic acid imide derivative and a vinyl monomer copolymerizable therewith.

As a second method, a method may be mentioned which comprises copolymerizing a mixture comprising an aromatic vinyl monomer, an unsaturated dicarboxylic acid anhydride and a vinyl monomer copolymerizable therewith, and then reacting ammonia and/or a primary amine thereto to convert the acid anhydride groups to imide groups.

By either method, the maleimide copolymer can be obtained.

The aromatic vinyl monomer may be a styrene monomer or its substituted monomer, such as styrene, α-methylstyrene, vinyl toluene, p-methylstyrene, t-butylstyrene or chlorostyrene. Among them, styrene is particularly preferred.

The unsaturated dicarboxylic acid imide derivative may, for example, be maleimide, or a maleimide derivative, for example, an N-alkylmaleimide such as N-methylmaleimide, N-butylmaleimide or N-cyclohexylmaleimide, or an N-arylmaleimide wherein the aryl group may, for example, be phenyl, chlorophenyl, methylphenyl, methoxyphenyl or tribromophenyl. Such derivatives may be used in combination as a mixture of two or more of them. Among them, N-phenylmaleimide is particularly preferred.

The unsaturated dicarboxylic acid anhydride which is used in the second method, may, for example, be maleic anhydride.

The vinyl monomer copolymerizable therewith may, for example, be a vinyl cyanide monomer such as acrylonitrile or methacrylonitrile, an acrylic acid ester monomer such as methyl acrylate or ethyl acrylate, a methacrylic acid ester monomer such as methyl methacrylate or ethyl methacrylate, a vinyl carboxylic acid monomer such as acrylic acid or methacrylic acid, acrylic acid amide, or methacrylic acid amide. Further, in the first method, maleic anhydride may also be mentioned. In the second method, maleic anhydride groups remained as not converted to maleimide groups, may be incorporated in the copolymer.

The ammonia or the primary amine to be used in the second method may be in an anhydrous state or in the form of an aqueous solution. The primary amine may, for example, be an alkylamine such as methylamine, ethylamine, butylamine or cyclohexylamine,i or an aromatic amine such as aniline, toluidine, chloroaniline, methoxyaniline or tribromoaniline. Among them, aniline is particularly preferred.

For the first method, any one of conventional polymerization methods such as suspension polymerization, emulsion polymerization, solution polymerization or bulk polymerization, may be employed. For the second method, bulk-suspension polymerization, solution polymerization or bulk polymerization may, for example, be suitably employed.

The maleimide copolymer is a copolymer comprising from 40 to 70 wt % of an aromatic vinyl monomer unit, from 30 to 60 wt % of an unsaturated dicarboxylic acid imide derivative unit and from 0 to 20 wt % of other copolymerizable vinyl monomer unit. If the composition is outside these ranges, the compatibility with other components tends to be poor, whereby the falling weight impact strength is likely to be low. More preferably, the copolymer comprises from 45 to 65 wt % of an aromatic vinyl monomer unit, from 35 to 55 wt % of an unsaturated dicarboxylic acid imide derivative unit and from 0 to 15 wt % of other copolymerizable vinyl monomer unit.

Now, the ABS graft copolymer will be described.

The ABS graft copolymer is a graft copolymer obtained by copolymerizing a monomer mixture comprising an aromatic vinyl monomer, a vinyl cyanide monomer and other copolymerizable vinyl monomer, in the presence of a rubber-like polymer.

The rubber-like polymer may, for example, be a butadiene polymer, a butadiene-styrene copolymer, an ethylene-propylene copolymer, an ethylene-propylene-diene copolymer, or an acrylic acid ester copolymer.

The aromatic vinyl monomer may be the same monomer as the aromatic vinyl monomer used in the above method for producing the maleimide copolymer. Styrene is particularly preferred.

The vinyl cyanide monomer may, for example, be acrylonitrile or methacrylonitrile, and acrylonitrile is particularly preferred.

As other copolymerizable vinyl monomer, the same monomer as said other copolymerizable vinyl monomer used in the above method for producing the maleimide copolymer, or an unsaturated dicarboxylic acid imide derivative, may be employed.

The ABS graft copolymer can be obtained by graft-copolymerizing from 30 to 70 parts by weight of a monomer mixture comprising from 65 to 80 wt % of the aromatic vinyl monomer, from 20 to 35 wt % of the Vinyl cyanide monomer and from 0 to 10 wt % of other copolymerizable vinyl monomer, in the presence of from 30 to 70 parts by weight of the rubber-like polymer. If the composition is outside these ranges, the compatibility with other components tends to be poor, whereby the falling weight impact strength is likely to be low. More preferably, the copolymer is obtained by graft-copolymerizing from 40 to 60 parts by weight of a monomer mixture comprising from 70 to 75 wt % of the aromatic vinyl monomer, from 25 to 30 wt % of the vinyl cyanide monomer and from 0 to 10 wt % of other copolymerizable vinyl monomer, in the presence of from 40 to 60 parts by weight of the rubber-like polymer.

In graft polymerization, it is usually difficult to graft the entire amount of monomers to a rubber-like polymer, and a non-grafted copolymer will be produced as a by-product. In the present inventions, the graft copolymer may be a pure graft copolymer having such a non-grafted copolymer positively separated and removed, or may be a graft polymer which contains such a non-grafted copolymer.

For the graft polymerization, any conventional polymerization technique may be employed. For example, an aqueous non-homogenous polymerization such as suspension polymerization or emulsion polymerization, bulk polymerization, solution polymerization or a precipitation polymerization in a poor solvent for the resulting polymer, may be mentioned. Emulsion polymerization is preferred from the viewpoint that the rubber particle size which is influential over the strength., can easily be controlled.

Now, the AS copolymer will be described.

The AS copolymer is a copolymer comprising an aromatic vinyl monomer unit, a vinyl cyanide monomer unit and other copolymerizable vinyl monomer unit.

The aromatic vinyl monomer may be the Same monomer as the aromatic vinyl monomer used in the above-mentioned method for preparing the maleimide copolymer. Among such monomers, styrene or α-methylstyrene is particularly preferred.

The vinyl cyanide monomer may, for example, be acrylonitrile or methacrylonitrile, and acrylonitrile is particularly preferred.

As other copolymerizable vinyl monomer, the same monomer as said other copolymerizable vinyl monomer used in the above-mentioned method for preparing the maleimide copolymer, may be employed.

The AS copolymer is a copolymer comprising from 65 to 80 wt % of the aromatic vinyl monomer, from 6m 20 to 35 wt of the vinyl cyanide monomer and from 0 to 10 wt % of other copolymerizable vinyl monomer. If the composition is outside these ranges, the compatibility with other components tends to be poor, whereby the falling weight impact strength is likely to be low. More preferably, it is a copolymer comprising from 68 to 78 wt % of the aromatic vinyl monomer, from 22 to 32 wt % of the vinyl cyanide monomer and from 0 to 10 wt % of other copolymerizable vinyl monomer.

The AS copolymer can be produced by a conventional polymerization method. For example, a polymerization method such as suspension polymerization, solution polymerization or emulsion polymerization may be employed.

The feature of the process for producing a maleimide-modified heat-resistant ABS resin of the present invention resides in that a maleimide-modified heat-resistant ABS resin having high falling weight impact strength is obtained by kneading the ABS graft copolymer and the AS copolymer or kneading a resign comprising the ABS graft copolymer and the AS copolymer, to a heat-resistant resistant master batch resin prepared by kneading the maleimide copolymer, the ABS graft copolymer and optionally the AS copolymer.

The composition of the heat-resistant master batch resin is preferably from 50 to 75 wt % of the maleimide copolymer, from 25 to 50 wt % of the ABS graft copolymer and from 0 to 20 wt % of the AS copolymer. If the composition is outside these ranges, the falling weight impact strength or the heat resistance of the finally obtainable maleimide-modified heat-resistant ABS resin tends to be low.

The blend ratio of the heat-resistant master batch resin, and the ABS graft copolymer and the AS copolymer, is preferably from 5 to 70 wt % of the heat-resistant master batch resin and from 30 to 95 wt % in total of the ABS graft copolymer and the AS copolymer. If the amount of the heat-resistant master batch resin iS less than 5 wt %, the effect for improving the heat resistance tends to be poor, and if it exceeds 70 wt %, the effect for preventing, deterioration in the falling weight impact strength can not be obtained even by the process of the present invention.

As a means for 6r kneading, a single screw extruder or a twin screw extruder can suitably be employed. For preliminary blending prior to kneading by an extruder, a conventional apparatus such as a Henschel mixer or a tumbler mixer may be employed.

To the heat-resistant master batch resin or the maleimide-modified heat-resistant ABS resin obtained by the process of the present invention, an antioxidant, an ultraviolet absorber, a coloring agent, a plasticizer, a lubricant, a flame retardant, glass fibers, carbon fibers, calcium carbonate, talc or mica, may, for example, be incorporated as the case requires.

Now, the present invention will be described in further detail with reference to Examples. However, it should be understood that the present invention is by no means restricted by such specific Examples. In the Examples, "parts" and "%" mean "parts by weight" and "% by weight", respectively.

Starting material resins

Used as the maleimide copolymer was a copolymer (SMI-1) of styrene/N-phenylmaleimide=50/50 having a weight average molecular weight of 182,000, a copolymer (SMI-2) of styrene/N-phenylmaleimide/acrylonitriles=50/35/15 having a weight average molecular weight of 165,000, or a copolymer (SMI-3) of styrene/N-phenylmaleimide/maleic anhydride=47/51/2 having a weight average molecular weight of 164,000.

Used as the ABS graft copolymer was a graft copolymer (GF) comprising 50% of butadiene rubber 37% of styrene and 13% of acrylonitrile having a graft ratio of 40% and a weight average molecular weight of the non-grafted copolymer of 84,000.

Used as the AS copolymer was a copolymer (AS) of styrene/acrylonitrile=75/25 having a Weight average molecular weight of 128,000.

Further, as the resin comprising an ABS graft copolymer and an AS copolymer, commercially available ABS resin "Denka GR-2000 (manufactured by Denki Kagaku Kogyo K. K.)" was used.

EXAMPLES 1 TO 10

(1) Preparation of heat-resistant master batch resin

Kneading for preparing the heat-resistant master batch resin was carried out by means of a twin screw extruder TEM-35B manufactured by Toshiba Kikai K. K. (diameter of screw: 37 mm, L/D=32) at a cylinder temperature of 280° C., a screw rotational speed of 200 rpm and a starting material feeding rate of 20/kg/hr. The compositions of the heat-resistant master batch resins thus prepared are shown in Table 1. The prepared master batch resins were referred to as MB-1 to MB-6, respectively.

TABLE 1

Compositions of heat-resistant master batch resins (parts by weight)

| Starting materials | MB-1 | MB-2 | MB-3 | MB-4 | MB-5 | MB-6 |
|---|---|---|---|---|---|---|
| SMI-1 | 60 | | | 50 | 60 | 60 |
| SMI-2 | | 70 | | | | |
| SMI-3 | | | 60 | | | |
| GF | 40 | 30 | 40 | 30 | 40 | 40 |
| AS | | | | 10 | | |
| Carbon black | | | | | 2 | |
| Titanium oxide | | | | | | 4 |

(2) Preparation of maleimide-modified heat-resistant ABS resin

Kneading for preparing the maleimide-modified heat-resistant ABS resin was carried out by means of a single screw extruder NVC-65 manufactured by Nakatani Kikai K. K. (diameter of screw: 65 mm, L/D=32) at a cylinder temperature of 260° C. at a screw rotational speed of 100 rpm and with a lap distance for adjusting the kneading degree being 10 mm. The discharge rate was about 100 kg/hr.

The compositions of the maleimide-modified heat-resistant ABS resins prepared in accordance with the method of the present invention and their physical properties are shown in Tables 2 and 3 as Examples 1 to 10.

TABLE 2

Examples 1 to 5 (Blend proportions are parts by weight)

| Starting materials | Example 1 | Example 2 | Example 3 | Example 4 | Example 5 |
|---|---|---|---|---|---|
| MB-1 | 25 | | | | 25 |
| MB-2 | | 25 | | | |
| MB-3 | | | 25 | | |
| MB-4 | | | | 25 | |
| GF | 30 | 30 | 30 | 30 | 30 |
| AS | 45 | 45 | 45 | 45 | 45 |
| Titanium oxide | | | | | 2 |
| Falling weight impact strength (cm) | | | | | |
| 2 mm thickness | 140 | 130 | 130 | 130 | 120 |
| 1.5 mm thick | 60 | 50 | 60 | 60 | 50 |
| Vicat softening point (°C.) | 111 | 108 | 113 | 112 | 112 |

TABLE 3

| | Examples 6 to 10 (Blend proportions are parts by weight) | | | | |
|---|---|---|---|---|---|
| Starting materials | Example 6 | Example 7 | Example 8 | Example 9 | Example 10 |
| MB-1 | | | 15 | 25 | |
| MB-3 | | | | | 50 |
| MB-5 | 25 | | | | |
| MB-6 | | 25 | | | |
| GF | 30 | 30 | | | |
| AS | 45 | 45 | | | |
| GR-2000 | | | 85 | 75 | 50 |
| Titanium oxide | | | 2 | 2 | 2 |
| Falling weight impact strength (cm) | | | | | |
| 2 mm thickness | 130 | 130 | 140 | 130 | 60 |
| 1.5 mm thick | 60 | 60 | 80 | 50 | 20 |
| Vicat softening point (°C.) | 111 | 111 | 107 | 112 | 124 |

COMPARATIVE EXAMPLES 1 TO 5

The physical properties of the maleimide-modified heat-resistant ABS resins prepared by a conventional process are shown in Table 4 as Comparative Example 1 which corresponds to Example 1, Comparative Example 2 which corresponds to Example 5, Comparative Example 3 which corresponds to Example 6, Comparative Example 4 which corresponds to Example 7 and Comparative Example 5 which corresponds to Example 10. In these Comparative Examples, kneading was carried out by means of a twin screw extruder TEM-35B under the same conditions as for the preparation of the heat-resistant master batch resin.

TABLE 4

| | Comparative Examples 1 to 5 (Blend proportions are parts by weight) | | | | |
|---|---|---|---|---|---|
| Starting materials | Comparative Example 1 | Comparative Example 2 | Comparative Example 3 | Comparative Example 4 | Comparative Example 5 |
| SMI-1 | 15 | 15 | 15 | 15 | |
| SMI-3 | | | | | 30 |
| GF | 40 | 40 | 40 | 40 | 38 |
| AS | 45 | 45 | 45 | 45 | 32 |
| Carbon black | | | 0.5 | | |
| Titanium oxide | | 2 | | 1 | 2 |
| Falling weight impact strength (cm) | | | | | |
| 2 mm thickness | 120 | 90 | 100 | 100 | 20 |
| 1.5 mm thick | 50 | 30 | 30 | 20 | <10 |
| Vicat softening point (°C.) | 111 | 112 | 111 | 111 | 123 |

Test specimens for measuring the physical properties were prepared by injection molding. The conditions for measuring the physical properties were as follows.

(a) Falling weight impact strength: In accordance with JIS K7211, the height at 50% breakage was measured. The test specimen was a square plate of 90 mm×90 mm×a thickness of 2 mm or 1.5 mm. The measuring temperature was 23° C., and the measuring humidity was 50% RH. The weight was 1 kg in the case of the square plate having a thickness of 2 mm or 500 g in the case of the square plate having a thickness of 1.5 mm. In each case, the forward end of the weight had 4.75 mmR.

(b) Vicat softening point: In accordance with JIS K7206, the Vicat softening point was measured under a load of 5 kg at a temperature raising rate of 50° C./hr using a test specimen of ¼ inch.

When Example 1 wherein no pigment was incorporated, is compared with Examples 5 and 7 wherein titanium oxide was incorporated and with Example 6 wherein carbon black was incorporated, no substantial deterioration is observed in the falling weight impact strength. Thus, it is evident that according to the process of the present invention, it is possible to prevent deterioration of the falling weight impact strength due to incorporation of a pigment.

When Example 1 is compared with Comparative Example 1, it is evident that even in a case where no pigment is incorporated, the falling weight impact strength of the maleimide-modified heat-resistant ABS resin prepared by the process of the present invention is higher.

Likewise, from the comparison between Example 5 and Comparative Example 2, between Example 6 and Comparative Example 3, between Example 7 and Comparative Example 4 and between Example 10 and Comparative Example 5, it is evident that according to the process of the present invention, it is possible to prevent deterioration in the falling weight impact strength of the maleimide-modified heat-resistant ABS resin in a case where a pigment is incorporated.

COMPARATIVE EXAMPLE 6

Comparative Example 6 will be described. To the maleimide-modified heat-resistant ABS resin prepared in Comparative Example 1, 2 parts of titanium oxide was incorporated, and the mixture was kneaded by a single screw extruder NVC-65. From the obtained pellets, a test specimen was prepared by injection molding, and its physical properties were measured. As a result, the Vicat softening point was 112° C. Further, the falling weight impact strength of a square plate having a thickness of 2 mm was 80 cm, and the falling weight impact strength of a square plate having a thickness of 1.5 mm was 20 cm.

From Comparative Example 6, it is evident that the effects of the present invention are not simply due to an increase number of kneading operation.

The maleimide-modified heat-resistant ABS resin obtained by the process of the present invention is excellent in the falling weight impact strength, which is an index of practical strength, whereby the wall thickness of a molded product can be reduced as compared with a maleimide-modified heat-resistant ABS resin obtained by a conventional process. Accordingly, it is possible to reduce the cost, and such a resin can be applied to various fields including fields of automobile parts, electric or electronic parts, household electric parts and sundries.

What is claimed is:

1. A process for producing a maleimide-modified heat resistant ABS resin comprising a maleimide copolymer, an ABS graft copolymer component consisting of one or more ABS graft copolymers, and an AS copolymer component consisting of one or more AS copolymers, which comprises kneading the maleimide copolymer, part of the ABS graft copolymer component and none or part of the AS copolymer component to obtain a heat-resistant master batch resin, and further (2a) kneading the remaining ABS graft copolymer component and all or the remaining AS copolymer component to the heat-resistant master batch resin or (2b) kneading a resin composed of the remaining ABS graft copolymer component and all or the remaining AS copolymer component, to the heat-resistant master batch resin.

2. The process for producing a maleimide-modified heat-resistant ABS resin according to claim 1, wherein from 50 to 75 wt % of the maleimide copolymer, from 25 to 50 wt % of the ABS graft copolymer and from 0 to 20 wt % of the AS copolymer are kneaded to obtain the heat-resistant master batch resin, and from 30 to 95 wt % in total of the ABS graft copolymer and the AS copolymer are further kneaded to from 5 to 70 wt % of the heat-resistant master batch resin.

3. The process for process for producing a maleimide-modified heat-resistant ABS resin according to claim 1, wherein the maleimide copolymer is a copolymer comprising from 40 to 70 wt % of an aromatic vinyl monomer unit, from 30 to 60 wt % of an unsaturated dicarboxylic acid imide derivative unit and from 0 to 20 wt % of the copolymerizable vinyl monomer unit.

4. The process for producing a maleimide-modified heat-resistant ABS resin according to claim 1, wherein the maleimide copolymer is a copolymer comprising from 45 to 65 wt % of an aromatic vinyl monomer unit, from 35 to 55 wt % of an unsaturated dicarboxylic acid imide derivative unit and from 0 to 15 wt % of other copolymerizable vinyl monomer unit.

5. The process for producing a maleimide-modified heat-resistant ABS resin according to claim i, wherein the maleimide copolymer comprises a styrene monomer unit and an N-phenyl maleimide monomer unit, or a styrene monomer unit, an N-phenyl maleimide monomer unit and an acrylonitrile monomer unit, or a styrene monomer unit, an N-phenylmaleimide monomer unit and a maleic anhydride monomer unit.

6. The process for producing a maleimide-modified heat-resistant ABS resin according to claim 1, wherein the ABS graft copolymer is a graft copolymer obtained by graft-copolymerizing from 30 to 70 parts by weight of a monomer mixture comprising from 65 to 70 wt % of an aromatic vinyl monomer, from 20 to 35 wt % of a vinyl cyanide monomer and from 0 to 10 wt % of other copolymerizable vinyl monomer, in the presence of from 30 to 70 parts by weight of a rubber polymer.

7. The process for producing a maleimide-modified heat-resistant ABS resin according to claim 6, wherein the rubber polymer is a butadiene polymer, and the aromatic vinyl monomer is a styrene monomer, and the vinyl cyanide monomer is acrylonitrile.

8. The process for producing a maleimide-modified heat-resistant ABS resin according to claim 1 or 2, wherein the ABS graft copolymer is a graft copolymer obtained by graft-copolymerizing from 40 to 60 parts by weight of a monomer mixture comprising from 70 to 75 wt % of an aromatic vinyl monomer, from 25 to 30 wt % of a vinyl cyanide monomer and from 0 to 10 wt % of other copolymerizable vinyl monomer, in the presence of from 40 to 60 parts by weight of a rubber polymer.

9. The process for producing a maleimide-modified heat-resistant ABS resin according to claim 1, wherein the ABS graft copolymer is a graft copolymer obtained by copolymerizing a monomer mixture comprising a styrene monomer and an acrylonitrile monomer, in a butadiene polymer.

10. The process for producing a maleimide-modified heat-resistant ABS resin according to claim 1, wherein the AS copolymer is a copolymer comprising from 65 to 80 wt % of an aromatic vinyl monomer, from 20 to 35 wt % of a vinyl cyanide monomer and from 0 to 10 wt % of other copolymerizable monomer.

11. The process for producing a maleimide-modified heat-resistant ABS resin according to claim 10, wherein the aromatic vinyl monomer is styrene and/or α-methylstyrene, and the vinyl cyanide monomer is an acrylonitrile.

12. The process for producing a maleimide-modified heat-resistant ABS resin according to claim 1, wherein the AS copolymer is a copolymer comprising from 68 to 78 wt % of an aromatic vinyl monomer, from 22 to 32 wt % of a vinyl cyanide monomer and from 0 to 10 wt % of other copolymerizable vinyl monomer.

13. The process for producing a maleimide-modified heat-resistant ABS resin according to claim 1, wherein the AS copolymer is a copolymer comprising a styrene monomer unit and an acrylonitrile monomer unit, or a styrene monomer unit, α-methylstyrene monomer unit and an acrylonitrile monomer unit.

14. A maleimide–modified heat–resistant ABS resin made by the process of claim 1.

* * * * *